(12) United States Patent
Currid et al.

(10) Patent No.: US 9,495,723 B2
(45) Date of Patent: Nov. 15, 2016

(54) SCALE-UP TECHNIQUES FOR MULTI-GPU PASSTHROUGH

(71) Applicant: NVIDIA Corporation, Santa Clara, CA (US)

(72) Inventors: Andrew Currid, Alameda, CA (US); Franck Diard, Saint Contest (FR); Chenghuan Jia, Fremont, CA (US); Parag Kulkarni, Pune (IN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/026,410

(22) Filed: Sep. 13, 2013

(65) Prior Publication Data

US 2015/0042664 A1  Feb. 12, 2015

Related U.S. Application Data

(60) Provisional application No. 61/864,171, filed on Aug. 9, 2013.

(51) Int. Cl.

| | |
|---|---|
| *G06F 3/00* | (2006.01) |
| *G06F 13/28* | (2006.01) |
| *G06F 13/00* | (2006.01) |
| *G06T 1/20* | (2006.01) |
| *G09G 5/36* | (2006.01) |
| *G06F 9/46* | (2006.01) |
| *G06F 3/14* | (2006.01) |
| *G06F 9/455* | (2006.01) |
| *G06F 9/50* | (2006.01) |
| *G09G 3/00* | (2006.01) |

(52) U.S. Cl.
CPC ............... *G06T 1/20* (2013.01); *G06F 3/1438* (2013.01); *G06F 9/46* (2013.01); *G09G 5/363* (2013.01); *G06F 9/455* (2013.01); *G06F 9/5077* (2013.01); *G09G 3/003* (2013.01); *G09G 2360/06* (2013.01); *G09G 2370/022* (2013.01)

(58) Field of Classification Search
CPC ........ G06F 9/46; G06F 9/455; G06F 9/5077; G06F 9/4445
USPC ...................... 710/26, 1, 100, 341
See application file for complete search history.

(56) References Cited

U.S. PATENT DOCUMENTS

| | | | | |
|---|---|---|---|---|
| 6,272,582 | B1 * | 8/2001 | Streitenberger | .... G06F 13/4027 710/314 |
| 7,334,054 | B2 * | 2/2008 | Anderson | ............... G09G 5/006 345/1.2 |
| 7,552,244 | B2 * | 6/2009 | MacIesowicz | ............ G06F 3/14 345/1.1 |
| 7,610,509 | B2 * | 10/2009 | Abe | ..................... G06F 11/2007 714/11 |

(Continued)

*Primary Examiner* — Idriss N Alrobaye
*Assistant Examiner* — Getente A Yimer
(74) *Attorney, Agent, or Firm* — Billion & Armitage (57) ABSTRACT

A device for processing graphics data includes a plurality of graphics processing units. Each graphics processing unit may correspond to a virtualized operating system. Each graphics processing unit may include a configuration register indicating a 3D class code and a command register indicating that I/O cycle decoding is disabled. The device may be configured to transmit a configuration register value to a virtualized operating system indicating a VGA-compatible class code. The device may be configured to transmit a command register value to the virtualized operating system that indicates that I/O cycle decoding is enabled. In this manner, legacy bus architecture of the device may not limit the number of graphics processing units deployed in the device.

20 Claims, 5 Drawing Sheets

(56) References Cited

U.S. PATENT DOCUMENTS

| | | | |
|---|---|---|---|
| 2003/0097506 A1* | 5/2003 | Chuang | G09G 5/363 710/301 |
| 2006/0150003 A1* | 7/2006 | Abe | G06F 11/2005 714/11 |
| 2006/0161704 A1* | 7/2006 | Nystad | G06F 9/54 710/105 |
| 2006/0253619 A1* | 11/2006 | Torudbakken | G06F 13/4022 710/31 |
| 2013/0106870 A1* | 5/2013 | Nystad | G06F 9/54 345/504 |

* cited by examiner

SCALE-UP TECHNIQUES FOR MULTI-GPU PASSTHROUGH

This application relates to U.S. Provisional Application No. 61/864,171, filed Aug. 9, 2013, which is hereby incorporated by reference in its entirety.

TECHNICAL FIELD

This disclosure relates to systems and methods for graphics processing and more particularly to techniques for enabling a large number of graphics processing units (GPUs) to be deployed within a virtualized server.

BACKGROUND

Devices including laptop or desktop computers, tablet computers, televisions, digital video recorders, set-top boxes, digital media players, video gaming devices, video game consoles, and cellular telephones may have wired or wireless communication capabilities and may utilize cloud based services. Cloud based services, such as cloud based gaming, may utilize remote servers with a plurality of graphics processing units (GPUs) for graphics acceleration. Remote servers may perform graphics processing and transmit graphics over a communication network to a client device for display.

A remote server may include an architecture based on the x86 instruction set architecture. A remote server may utilize a virtual platform to allocate its hardware resources among a plurality of client devices. A virtual platform may allow multiple operating systems to operate on a remote server.

SUMMARY

In general, this disclosure describes techniques for enabling a large number of graphics processing units (GPUs) to be deployed within a virtualized server. In particular, this disclosure describes techniques for increasing the number of GPUs that may be deployed within a virtualized sever.

According to one example of the disclosure, a method for virtualizing register values of a device comprises determining that a configuration register of a device indicates that the device includes a 3D class code, selecting the device as a primary display device for a virtualized operating system, transmitting a configuration register value to the operating system that indicates that the device includes a VGA-compatible class code, and transmitting a command register value to the operating system that indicates that I/O cycle decoding is enabled for the device.

According to another example of the disclosure a non-transitory computer-readable storage medium comprises instructions stored thereon, that upon execution, cause one or more processors of a device to determine that a configuration register of a device indicates that the device includes a 3D class code, select the device as a primary display device for a virtualized operating system, transmit a configuration register value to an operating system that indicates that the device includes a VGA-compatible class code, and transmit a command register value to the operating system that indicates that I/O cycle decoding is enabled for the device.

According to another example of the disclosure an apparatus for virtualizing register values of a device, comprises means for determining that a configuration register of a device indicates that the device includes a 3D class code, means for selecting the device as a primary display device for a virtualize operating system, means for transmitting a configuration register value to an operating system that indicates that the device includes a VGA-compatible class code, and means for transmitting a command register value to the operating system that indicates that I/O cycle decoding is enabled for the device.

According to another example of the disclosure a device for processing graphics data comprises a plurality graphic processing units, each corresponding to one of a plurality of virtualized operating systems, wherein each of the graphics processing units includes a configuration register indicating that the graphics processing unit includes a 3D class code and a command register indicating that I/O cycle decoding is disabled for the graphics processing unit, and a non-transitory computer readable medium having instructions stored thereon that, when executed, cause one of more processors of the device to transmit a configuration register value to a virtualized operating system corresponding to one of the plurality of graphic processing units that indicates that the graphic processing unit includes a VGA-compatible class code and transmit a command register value to the virtualized operating system corresponding to the one of the plurality of graphic processing units that indicates that I/O cycle decoding is enabled for the graphics processing unit.

The details of one or more examples are set forth in the accompanying drawings and the description below. Other features, objects, and advantages will be apparent from the description and drawings, and from the claims.

DETAILED DESCRIPTION

In general, this disclosure describes techniques for increasing the number of GPUs that may be deployed within a virtualized server. In cloud based applications, such as, for example, cloud based gaming, a virtualized server may have a virtual machine corresponding to each of plurality of concurrent users. Virtualized servers are commonly implemented using hardware based on industry-standard Intel® based server hardware. Virtualized servers may include a hypervisor, such as, for example, those developed by Citrix Systems, Inc., those developed by the Linux Foundation (e.g., XenServer, Xen Cloud Platform, and the Kernel-based Virtual Machine (KVM) for the Linux Kernel), and those developed by VMware, Inc. (e.g., VMwase ESXi). Hypervisors allow multiple operating systems, for example, multiple instances of Microsoft® operating systems, to operate on a server. A hypervisor may also be referred to as a virtual machine monitor (VMM). NVIDIA's GRID servers are one example of servers that may include standardized hardware components and may include a hypervisor similar to one of the hypervisors described above. Further, Amazon® Elastic Cloud Compute (EC2) is an example of a web service that may use on or more conventional virtualized servers.

For some applications the maximum number of concurrent users that a virtualized server can support, and the cost efficiency of a virtualized server for a service provider, may be based on the number of GPUs that can be deployed within the virtualized server. For some applications, each virtual machine may require a dedicated GPU in order to provide users with an acceptable graphics experience. Thus, for some applications the number of concurrent users is limited to the number of GPUs that can be deployed within a virtualized server.

Examples of conventional virtualized servers include servers incorporating NVIDIA® GRID hardware. Current implementations of NVIDIA® GRID hardware allow for a maximum of 12 GPUs to be used per server. In most cases, the limit on the number of GPUs per server is not imposed by CPU processing, power, or physical space constraints, but by architectural constraints of the legacy architectures. For example, legacy instruction set architectures (e.g., Intel® architectures, such as, for example, x86 based architectures), legacy graphics controller architectures, (e.g., VGA based architectures), and/or legacy bus architectures, (e.g., PCI based architectures, and ISA based architectures) may limit the number of GPUs that may be deployed within a virtualized server. Due to the benefits of standardization, it is anticipated that virtualized servers will continue to include architectures based on legacy architectures. This disclosure describes techniques for increasing the number of GPUs that may be deployed within a virtualized server, wherein the architecture of the virtualized server constrains the number of GPUs that may be deployed. The techniques described herein may be used for increasing the numbers of GPUs within a virtualized server, wherein the virtualized server is used to support multiple Windows® virtual machines with dedicated GPUs for graphics acceleration.

In a virtualized server GPUs may be configured to communicate according to a Peripheral Component Interconnect (PCI) standard. For example, GPUs may be configured to communicate according to the PCI Express™ ("PCIe") bus specification, which is maintained by the Peripheral Component Interconnect Special Interest Group and includes the PCI Express Base 3.0 Specification and the PCI Express Card Electromechanical (CEM) 3.0 specification, both of which are incorporated by reference herein in their entirety. PCI devices advertise a class code that describes the function they are intended to perform. GPUs typically expose one of two class codes: (1) the VGA-Compatible class code, which indicates that the device supports legacy VGA programming interfaces; and (2) 3D Controller class code, which indicates that the device supports a proprietary programming interface. GPUs with either class code can support GPU rendering and output visual content. However, a device having a VGA-Compatible class code decodes legacy VGA I/O ranges and typically includes an I/O BAR (Base Address Register) that exposes additional, I/O mapped registers. Thus, a device having a VGA-Compatible class code may be required to expose an I/O BAR. Whereas a device exposing a 3D controller class does not have the same constraints and may not be required to expose an I/O BAR.

Further, operating systems, such as, for example, Windows® operating systems developed by Microsoft, Inc. may be constrained such that a 3D controller cannot be used as a primary display device. That is, some operating systems may not use a device exposing a 3D controller class for initially rendering and displaying a desktop, and, in the case of Windows® operating systems, a taskbar and start menu. A virtualized machine running a Windows® operating system may use a GPU having a 3D controller class code as a secondary rendering device. Thus, a virtualized machine running a Windows® operating system may be limited to using only a GPU having a VGA-compatible class code as a primary display device. Further, it should be noted that for pass through graphics applications, a typical approach is to use GPU devices with a VGA-compatible class code as the primary display device of Windows® virtual machines and require server platforms to provide a mechanism to ensure these devices are never selected as the console boot device.

GPUs configured to communicate according to PCIe may be located behind a PCIe switch. In the case where GPUs or other PCIe devices are located behind a PCIe switch and expose an I/O BAR, they consume a minimum of 4 kilobytes of I/O space regardless of how many I/O registers they actually implement. This is due to the granularity of the I/O aperture on a PCI bridge, which is 4 kilobytes. It should be noted that although GPUs may be connected using a configuration that does not include PCI bridges and PCIe switches, such a configuration may not be able to be practically implemented in server with a standard x86 based architecture.

For x86 based architectures space is limited to 16 bits of addressing, or 64 kilobytes. According to x86, this space must be shared between all devices requiring I/O space. Thus, a maximum of 16 GPUs having VGA-Compatible class codes can theoretically be supported behind a PCI bridges and PCIe switches. That is, 16 devices consuming 4 kilobytes each of I/O space consumes the allocated I/O space of 64 kilobytes. It should be noted that this theoretical maximum number of GPUs should not be confused with a theoretical maximum number of GPUs that may be included in a server using a configuration that does not include PCI bridges and PCIe switches, which may be higher, but may not be able to be practically implemented. Further, in practice there are typically several other devices, other than GPUs, within a server that have fixed I/O space requirements. The number of addition devices connected to a PCI bridge further lowers the number of GPUs that can actually be supported within a server.

Current servers, such as NVIDIA® GRID servers, allow 48 kilobytes of I/O space to be allocated for GPUs, thereby allowing 12 GPUs having VGA-Compatible class codes to be supported. The techniques described herein may be used to enable 16 or more GPUs to be deployed on a server with an industry standard platform, such as, for example, an x86 based platform with PCIe. In some cases, the number of GPUs that can be enabled on a server using the techniques described herein may realistically be bounded only by power and physical space constraints. Thus, the techniques described herein may allow a server to support a higher number of concurrent users running Windows® virtual machines with dedicated GPUs. For example, the techniques described herein may be used to implement servers for applications that require more than 12 concurrent users in order to be cost-effective.

Figure 1:
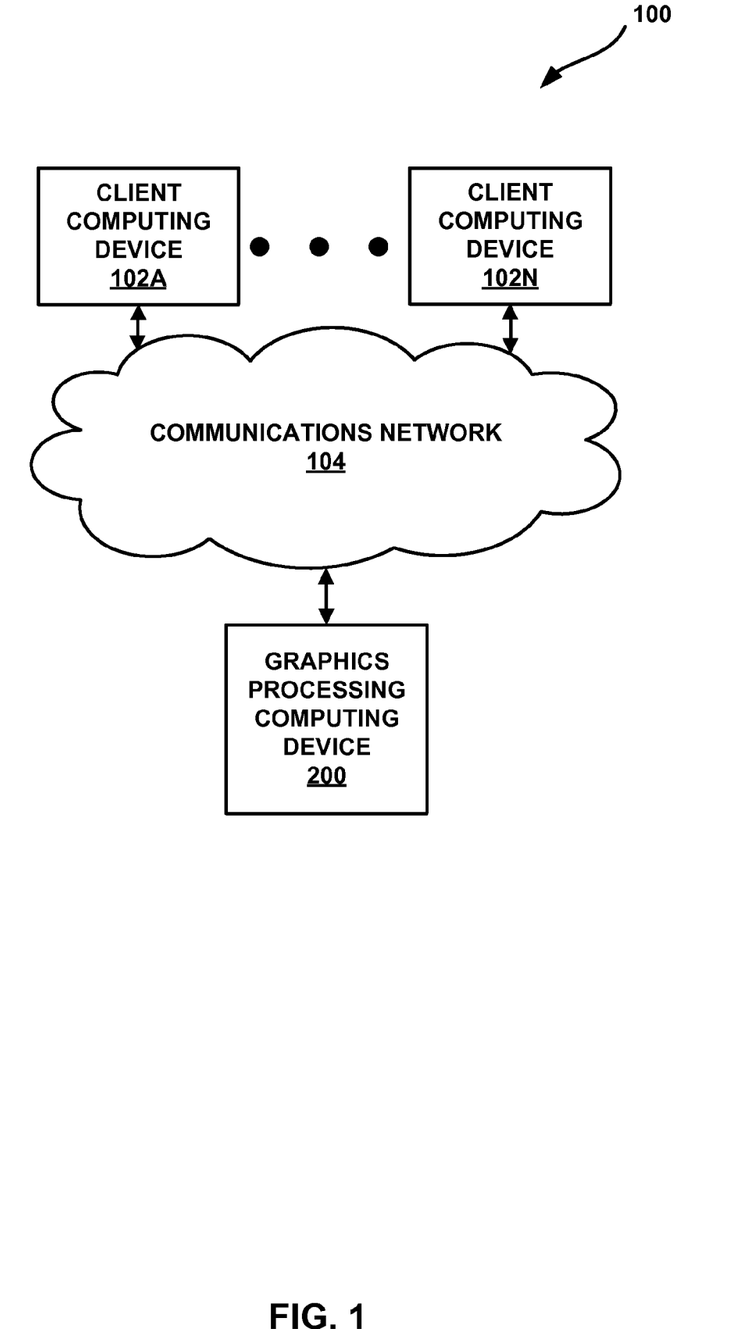
FIG. 1 is a block diagram illustrating an example system that may implement one or more techniques of this disclosure.

FIG. 1 is a block diagram illustrating an example system that may implement one or more techniques of this disclosure. System 100 may be configured to provide network distributed graphics processing in accordance with the techniques described herein. In the example illustrated in FIG. 1, system 100 includes one or more client computing devices 102A-102N, communications network 104, and graphic processing computing device 200. In the example illustrated in FIG. 1, computing devices 102A-102N may include any device configured to transmit data to and receive data from communication network 104. For example, computing devices 102A-102N may be equipped for wired and/or wireless communications and may include devices, such as, for example, desktop or laptop computers, mobile devices, smartphones, cellular telephones, personal data assistants (PDA), tablet devices, set top boxes, and personal gaming devices. In one example, computing devices 102A-102N may be configured to send and receive data from communications network 104 and run applications associated with a cloud based gaming service. Computing devices 102A-102N may be referred to as client devices. In one example, computing devices 102A-102N may have limited graphics processing capabilities.

Communications network 104 may comprise any combination of wireless and/or wired communication media. Communication network 104 may include routers, switches, base stations, or any other equipment that may be useful to facilitate communication between various devices and sites. Communication network 104 may form part of a packet-based network, such as a local area network, a wide-area network, or a global network such as the Internet. Communication network 104 may operate according to one or more communication protocols, such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards, as well as various combinations thereof. In one example, communications network 104 may be configured to enable communications associated with a cloud based gaming service.

Graphic processing computing device 200 may include any device configured to perform graphics processing and to transmit data to and receive data from communication network 104. In one example, graphics processing computing device 200 may be a virtualized server including a virtual machine and a dedicated GPU corresponding to each of computing devices 102A-102N. In one example, graphics computing device 200 may be configured to support graphics acceleration concurrently for 16 computing devices 102A-102N. Graphics processing computing device 200 may include software modules stored in a memory and executed by a processor. Graphics processing computing device 200 may include one or more processors and a plurality of internal and/or external memory devices. Examples of memory devices include file servers, FTP servers, network attached storage (NAS) devices, a local disk drive, or any other type of device or storage medium capable of storing data. Storage medium may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

Figure 2:
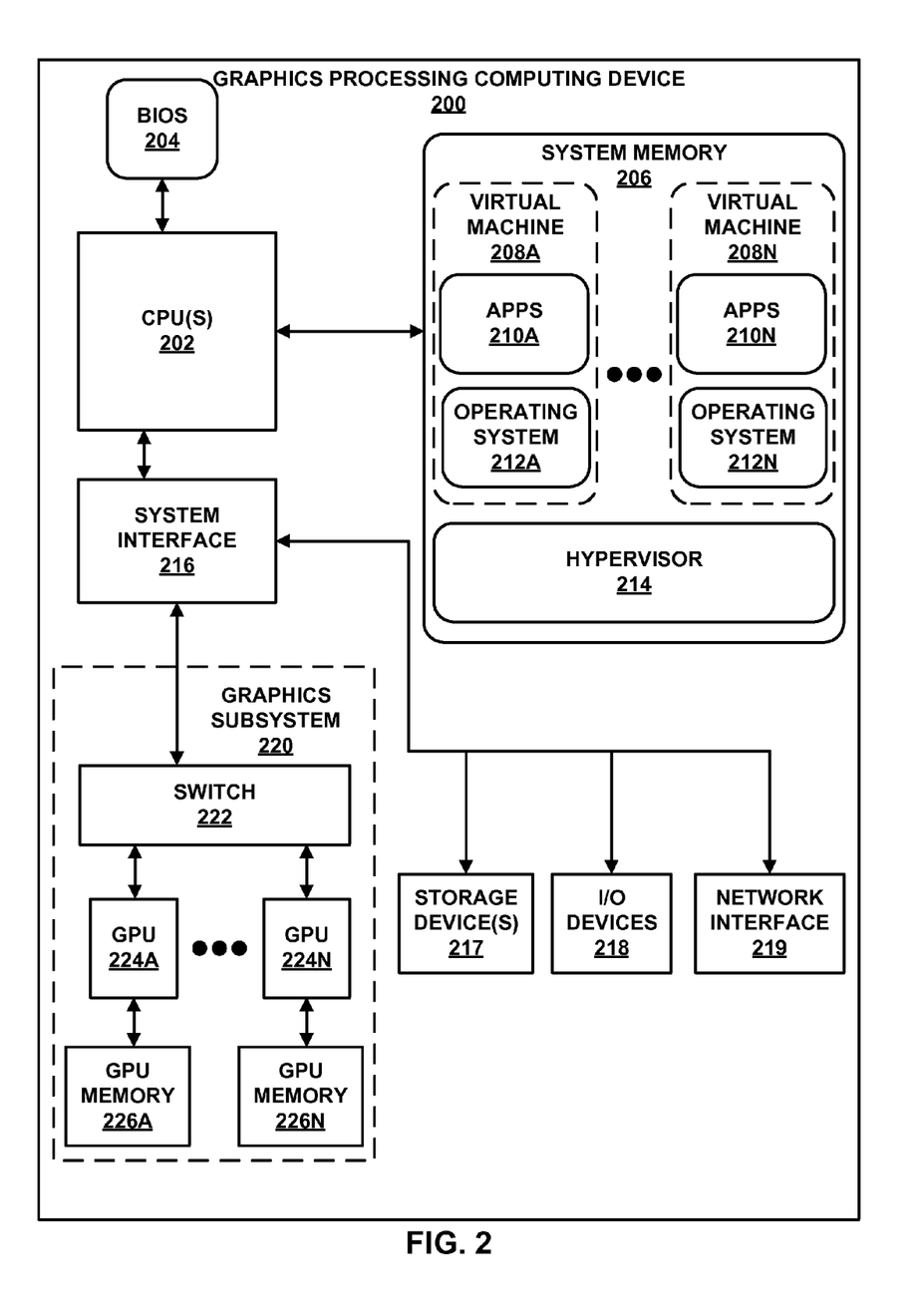
FIG. 2 is a block diagram illustrating an example of a computing device that may implement one or more techniques of this disclosure.

FIG. 2 is a block diagram illustrating an example of a graphics processing computing device that may implement one or more techniques of this disclosure. Graphic processing computing device 200 is an example a computing device configured to perform graphics processing and to transmit data to and receive data from a communication network, such as for example, communication network 104. Graphics processing computing device 200 may include or be part of a server. Graphics processing computing device 200 includes central processor unit(s) 202, BIOS 204, system memory 206, system interface 216, storage device(s) 217, I/O device(s) 218, network interface 219, and graphics subsystem 220. As illustrated in FIG. 2, system memory 206 includes virtual machines 208A-208N and hypervisor 214. Further, as illustrated in FIG. 2, graphics subsystem 220 includes switch 222, GPUs 224A-224N, and GPU memory 226A-226N. It should be noted that although example graphics computing device 200 is illustrated as having distinct functional blocks, such an illustration is for descriptive purposes and does not limit graphics processing computing device 200 to a particular hardware or software architecture. Functions of graphics processing computing device 200 may be realized using any combination of hardware, firmware and/or software implementations.

CPU(s) 202 may be configured to implement functionality and/or process instructions for execution in graphic processing computing device 200. CPU(s) 202 may be capable of retrieving and processing instructions, code, and/or data structures for implementing one or more of the techniques described herein. Instructions may be stored on a computer readable medium, such as system memory 206 or storage devices 217. CPU(s) 202 may include digital signal processors (DSPs), general purpose microprocessors, application specific integrated circuits (ASICs), field programmable logic arrays (FPGAs), or other equivalent integrated or discrete logic circuitry. CPU(s) 202 may be a multi-core central processing unit. CPU(s) 202 may be configured such that dedicated graphic processing units, such as those included in graphics subsystem 220, are used for graphics processing.

BIOS (Basic Input/Output System) 204 may include a storage medium having low-level system software stored thereon. For example, BIOS 204 may include a program stored in read only memory ("ROM") or flash memory that is run whenever the graphics processing computing device 200 boots up and enables basic input and output functionality. Further, BIOS 204 may be configured to enumerate all VGA controllers of graphics processing computing device 200 and select one of them as a boot console device, thereby providing physical display output during BIOS initialization and early boot of an operating system or hypervisor. BIOS 204 may also be referred to as System BIOS (SBIOS).

System memory 206 may be configured to store information that may be used by graphic processing computing device 200 during operation. For example, system memory 206 may store instructions associated with a plurality of virtual machines 208A-208N, where each virtual machine includes applications 210A-210N and an instance of an operating system 212A-212N. Virtual machines 208A-208N are described in greater detail below with respect to FIG. 3. Further, system memory may store instructions associated with hypervisor 214 and/or components thereof. It should be noted that although hypervisor 214 is illustrated as a bare metal hypervisor, (i.e., operating directly on graphic processing computing device 200) and not as a hosted hypervisor (i.e., operating within an operating system environment), hypervisor 214 may include any type of hypervisor. System memory 206 may be described as a non-transitory or tangible computer-readable storage medium. In some examples, system memory 206 may provide temporary memory and/or long-term storage. In some examples, system memory 206 or portions thereof may be described as non-volatile memory and in other examples portions of system memory may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System interface 216 may be configured to enable communication between components of graphics processing computing device 200. In one example, system interface 216 comprises structures that enable data to be transferred from one peer device to another peer device or to a storage medium. For example, system interface 216 may include a chipset supporting Accelerated Graphics Port ("AGP"), PCI bus, PCIe bus protocols, or any other form of structure that may be used to interconnect peer devices.

As described above, PCIe uses class codes to describe the function that devices are intended to perform. In the example where system interface 216 includes a PCIe bus, devices connected to system interface 216 may include a class code in a configuration register. Further, devices connected to system interface 216 may also include a command register to indicate whether functions are enabled. For example, a device may include a bit in a command register that indicates whether it is enabled for I/O cycle decode. As described above, and in more detail below, an operating system may handle a device differently based on what a configuration register and/or a command register expose. It should be noted that although techniques of this disclosure are described with respect to PCIe, the techniques are generally applicable to other bus standards.

Storage device(s) 217 represents memory of graphic processing computing device 200 that may be configured to store relatively larger amounts of information for relatively longer periods of time than system memory 206. Similar to system memory 206, storage device(s) 217 may also include one or more non-transitory or tangible computer-readable storage media. Storage device(s) 217 may be internal or external memory and in some examples may include non-volatile storage elements.

I/O device(s) 218 may be configured to receive input and provide output for graphics processing computing device 200. Input may be generated from an input device, such as, for example, touch-sensitive screen, track pad, track point, mouse, a keyboard, a microphone, video camera, or any other type of device configured to receive input. Output may be provided output devices, such as, for example speakers or a display device. In some examples, I/O device(s) 210 may be used for basic input and output functions associated with BIOS 204. In some examples, I/O device(s) 210 may be external to graphics processing computing device 200 and may be operatively coupled to graphics processing computing device 200 using a standardized communication protocol, such as for example, Universal Serial Bus protocol (USB).

Network interface 219 may be configured to enable graphics processing computing device 200 to communicate with external computing devices via one or more networks, such as communications network 104. Network interface 214 may be a network interface card, such as an Ethernet card, an optical transceiver, a radio frequency transceiver, or any other type of device that can send and receive information. Network interface 214 may be configured to operate according to one or more of the communication protocols described above with respect to communications network 104. In one example, network interface 214 may be used by graphics processing computing device 200 to transmit graphics data to computing devices 102A-102N.

Graphics processing computing device 200 may be configured to provide a dedicated GPU corresponding to each of computing devices 102A-102N. As illustrated in FIG. 2, graphics subsystem 220 includes GPUs 224A-224N. Each GPUs 224A-224N may correspond to each of virtual machines 208A-208N, where each of virtual machines 208A-208N corresponds to computing devices 102A-102N. That is, each of GPUs 224A-224N may be passed on to a respective virtual machine 208A-208N. In one example, GPUs 224A-224N may include a least 16 GPUs. GPUs 224A-224N may be configured to receive commands and data and output pixel data. GPUs 224A-224N may include multiple processing cores. GPUs 224A-224N may be configured to operate according to OpenGL (Open Graphic Library, managed by the Khronos Group) and/or Direct3D (managed by Microsoft, Inc.), both of which are incorporated by reference herein in their entirety. GPUs 224A-224N may operate according to a graphics pipeline process (e.g., input assembler, vertex shader, geometry shader, rasterizer, pixel shader, and output merger.) In one example, GPUs 224A-224N may be server-class GPUs and may be built without physical display connectors. GPU memory 226A-226N may include storage devices configured to store data generated during a graphics pipeline process. For example, GPU memory 226A-226N may include a frame buffer. Further, GPU memory 226A-226N may store instructions that are executed by GPUs 224A-224N.

As described above, GPUs configured to communication according to PCIe may be located behind a PCIe switch. Switch 222 is a switch configured to connect a plurality of GPUs to a communication bus. In one example, the communication bus may be configured according to PCIe. In other examples, the communication bus may be configured according to another bus standard. In the example, where switch 222 is a PCIe switch, each of GPUs 224A-224N may include a configuration register and a command register, as specified by the PCIe specification. As the described above, and in further detail below, the number of GPUs 224A-224N that may be included in graphics subsystem 220 may be based on values included in a configuration register and values included in a command register.

In one example, each of GPUs 224A-224N may have primary display and 3D rendering capabilities, but one or more of GPUs 224A-224N may have a 3D controller class code and no legacy I/O BAR in order to increase the number of GPUs that may be included in graphics subsystem 220. In one example, as described in detail below with respect to FIG. 4, three of every four of GPUs 224A-224N may have a 3D controller class code and no legacy I/O BAR. As described above, removing the legacy I/O BAR removes the space limitations imposed by legacy I/O space (i.e., 64 kilobytes of I/O space), allowing larger numbers of the GPUs to be supported in the platform. In the case where one or more of GPUs 224A-224N do not implement I/O BARs, a command register may indicate that I/O cycle decoding is disabled. It should be noted that in some cases, graphics processing computing device 200 may become unusable if the BIOS 204 selects a displayless GPU as its boot console device. Using a 3D Controller class code for GPUs 224A-224N may further allow GPUs 224A-224N to be deployed in graphic processing computing device 200 without any special support required by BIOS to avoid using them as console devices.

As illustrated in FIG. 2, each of virtual machines 208A-208N includes applications 210A-210N. GPUs 224A-224N perform graphics processing associated with the execution of applications 210A-210N. Applications 210A-210N may be any applications implemented within or executed by graphics processing computing device 200 and may be implemented or contained within, operable by, executed by, and/or be operatively/communicatively coupled to components of graphics processing computing device 200s. Applications 210A-210N may include instructions that may cause CPU(s) 202 of computing device 200 to perform particular functions. Applications 210A-210N may include algorithms which are expressed in computer programming statements, such as, for loops, while-loops, if-statements, do-loops, etc. In one example, applications 210A-210N may be executed in as part of a cloud based gaming service.

As further illustrated in FIG. 2, applications 210A-210N may execute on top of operating systems 212A-212N. Operating systems 212A-212N may be configured to facilitate the interaction of applications with CPUs(s) 202, and other hardware components of graphics computing device 200, such as, for example, graphics subsystem 220. Operating systems 212A-212N may be an operating system designed to be installed on laptops and desktops. For example, operating systems 212A-212N may be a Windows® operating system, Linux, or Mac OS. In one example, operating systems 212A-212N may include Windows® operating systems that are limited to using only a GPU having a VGA-compatible class code as a primary display device. Thus, in some cases, in the example where GPUs 224A-224N have a 3D controller class code, devices operating systems 212A-212N may not be able to use GPUs 224A-224N as primary display device. Further, in some cases, Windows® will not select a device with a VGA class code as its primary display device unless the command register of the device indicates that I/O decode is enabled, as would be expected for a VGA controller device. Thus, in some cases, even if the class code of a 3D controller device is virtualized to a VGA controller, Windows® may not use the device as a primary display device.

As illustrated in FIG. 2, virtual machines 208A-208N may execute on top of hypervisor 214. Hypervisor 214 may be based on any of the example hypervisors described above. Further, hypervisor 214 may be configured to virtualize registers of hardware device of graphics processing computing device 200. For example, when each of GPUs 224A-224N include a configuration register and a command register, as specified by the PCIe specification, hypervisor 214 may be configured to virtualize these register values. In one example, hypervisor 214 may be configured to virtualize register values so operating systems 212A-212N will use a GPUs 224A-224N having a 3D class code as a primary display device. Virtualizing register values may increase the number of GPUs that can be deployed in graphic processing computing device 200.

Figure 3:
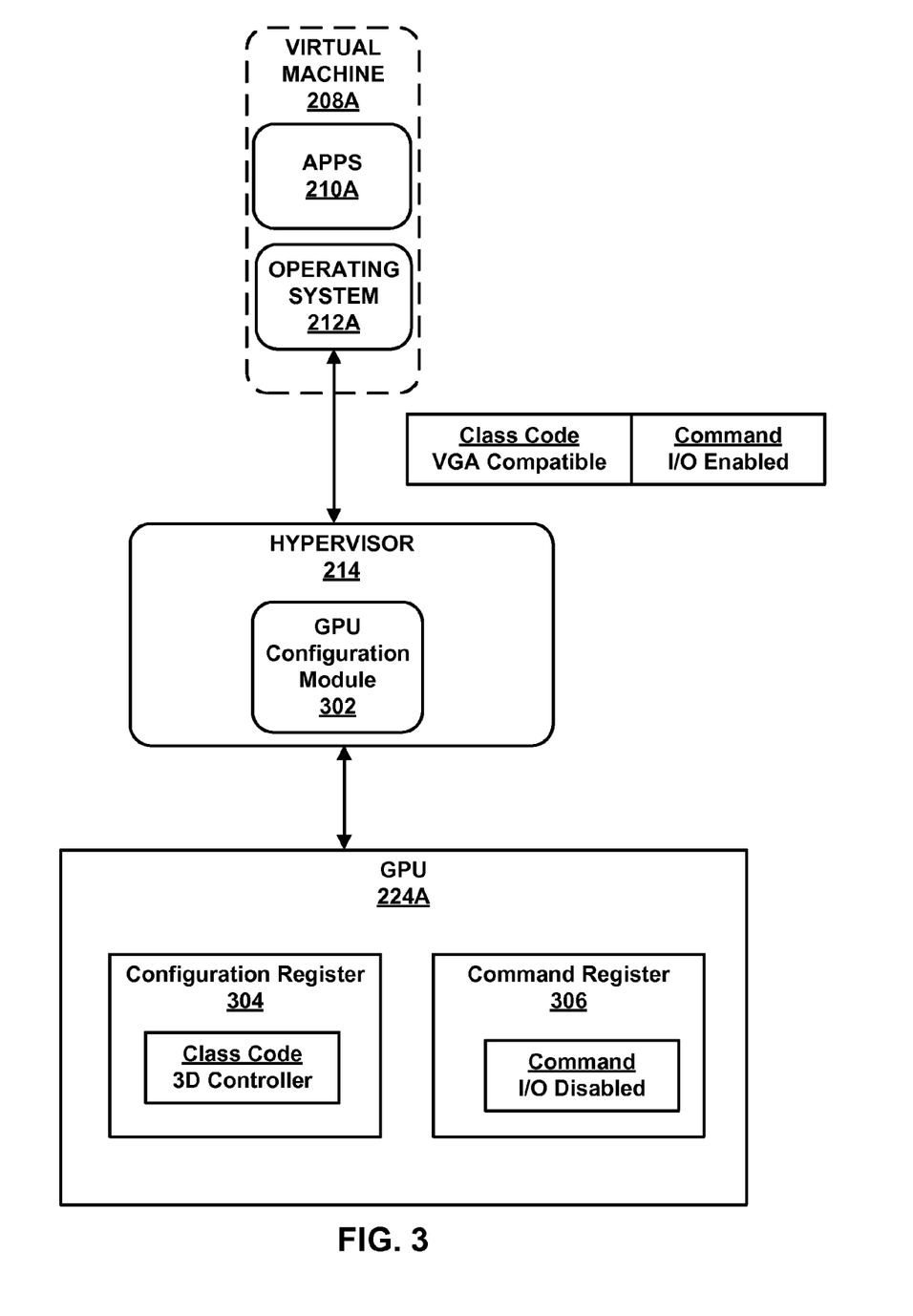
FIG. 3 is a block diagram illustrating a detailed view of a computing device that may implement one or more techniques of this disclosure.

FIG. 3 is a block diagram illustrating a detailed view of a computing device that may implement one or more techniques of this disclosure. FIG. 3 illustrates an example interaction between a virtual machine 208A, hypervisor 214, and a GPU 224A. In the example illustrated in FIG. 3, virtual machine 208A, hypervisor 214, and a GPU 224A may communicate using a PCIe bus. As illustrated in FIG. 3, GPU 224A includes configuration register 304 indicating that GPU 224A has a 3D controller class code and includes a command register 306 indicating that I/O decoding is disabled (i.e., not enabled). In the example illustrated in FIG. 3, GPU 224A has no I/O BAR. In the example, illustrated in FIG. 3, operating system 212A may be a Windows® operating system that will not select a device as its primary display unless the device has I/O decode enabled. Thus, in the example illustrated in FIG. 3, because the GPU 224A has a 3D controller class code and has no I/O BAR, operating system 212A would not normally not use GPU 224A as a primary display device. However, as illustrated in FIG. 3, hypervisor 214 includes GPU configuration module 302. GPU configuration module 302 is configured to utilize techniques described herein to enable operating system 212A to use GPU 224A as a primary display device.

GPU configuration module 302 is configured to recognize when a 3D controller device is being passed to a Windows® guest virtual machine for use as a primary display device. GPU configuration module 302 detects when a 3D controller, such as GPU 224A, is being assigned to a virtual machine, such as virtual machine 208A, and determines that the device should be assigned to the virtual machine as its primary display device. In some examples, GPU configuration module 302 uses a vendor-specific mechanism to determine that the device should be assigned to the virtual machine 208A. Vendor-specific mechanisms may include, for example, those developed by NVIDIA, Inc.

Upon determining that a 3D controller GPU device should be assigned to the virtual machine as a primary display device, GPU configuration module 302 may virtualize the class code of a 3D Controller GPU device, such that the GPU's class code appears to be a VGA controller device to a Virtual Machine. By exposing a VGA classcode within the virtual machine, Windows® will consider using this device as its primary display device. Further, GPU configuration module 302 may virtualize the command register of the GPU device as seen within a Virtual Machine, such that on a Windows® boot the GPU device appears to be enabled to decode I/O cycles. By exposing I/O decode enabled on the GPU device, Windows® will use the GPU device as primary display device. In some examples, virtual machine 208A may be configured such that operating system 212A will recognize the GPU 224A as a primary graphics device and load the NVIDIA® WDDM (Windows® Display Driver Model) driver, thereby enabling full graphics acceleration in virtual machine 208A in preference to any emulated VGA controller, once a WDDM driver is loaded for GPU 224A. It should be noted that in some cases, hypervisors typically present an emulated VGA controller to a virtual machine, alongside any pass through VGA device. In this manner, graphic processing computing device 200 represents an example of a device configure to virtualize register values. Virtualizing register values may enable a larger number of graphics processing units (GPUs) to be deployed within a virtualized server.

Figure 4:
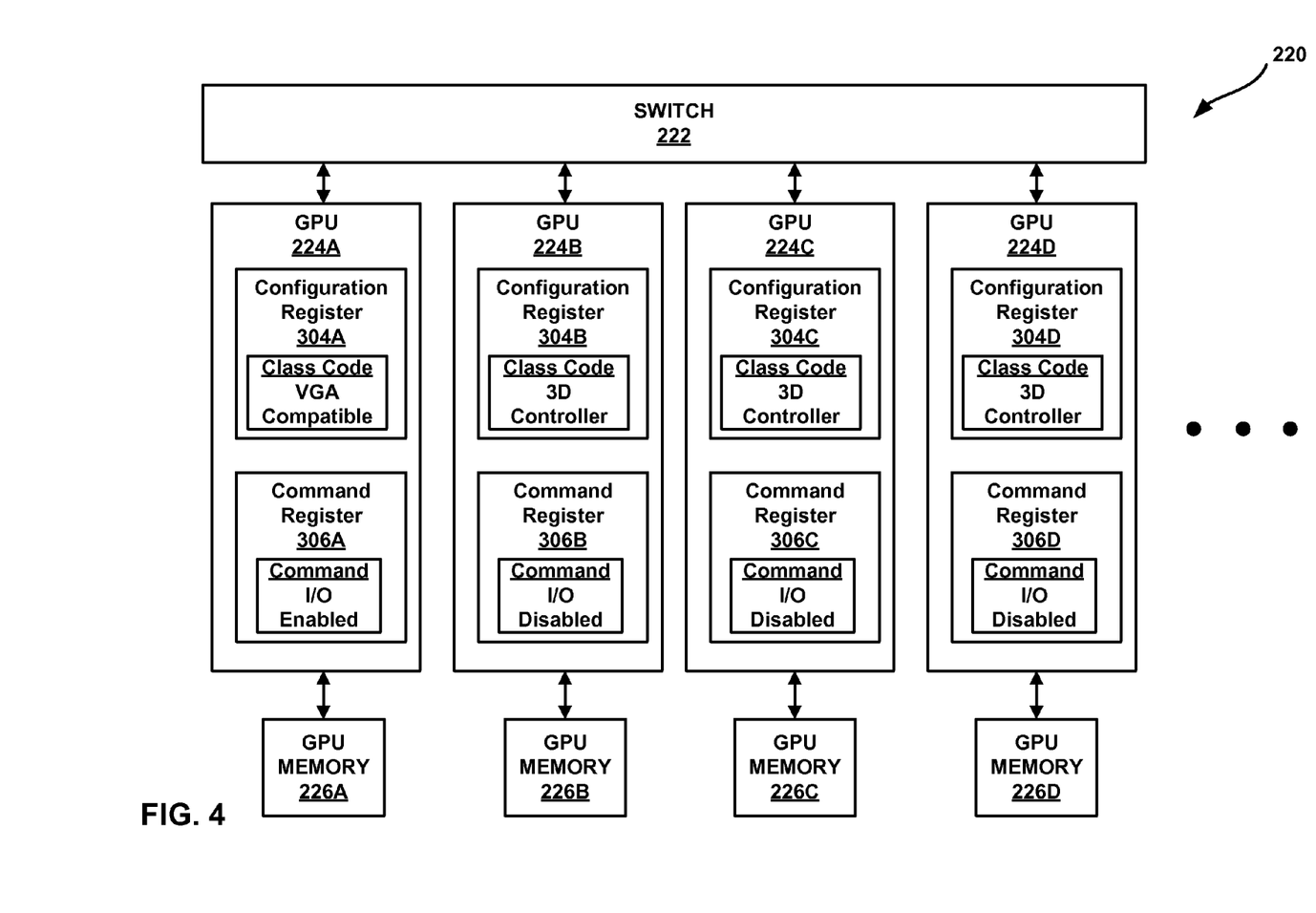
FIG. 4 is a block diagram illustrating an example of a graphics subsystem that may implement one or more techniques of this disclosure.

FIG. 4 is a block diagram illustrating an example of a graphics subsystem that may implement one or more techniques of this disclosure. FIG. 4 is an example of a graphics subsystem including a large number of GPUs to that may be deployed within a virtualized server according to the techniques described herein. As illustrated in FIG. 4, graphics subsystem 220 includes one GPU, GPU 224A, including a configuration register 304A indicating that GPU has a VGA controller class code and a command register 306 indicating that I/O decoding is enabled. Further, as illustrated in FIG. 4, graphics subsystem 220 includes three GPUs, GPUs 224B, 224C, and 224D, including configuration registers 304B, 304C, and 304D indicating that GPUs 224B, 224C, and 224D have a 3D controller class code and command registers 306B, 306C, and 306D indicating that I/O decoding is disabled (i.e., not enabled). Thus, the graphics subsystem 220 is an example graphics subsystem where three of every four GPUs have a 3D controller class code and no legacy I/O BAR. In one example, graphics subsystem 220 may include sixteen or more GPUs where three of every four of GPUs have a 3D controller class code and no legacy I/O BAR. As described above, GPUs having a 3D controller class code and no legacy I/O BAR may virtualized, using, for example, GPU configuration module 302 to be used as a primary display.

Figure 5:
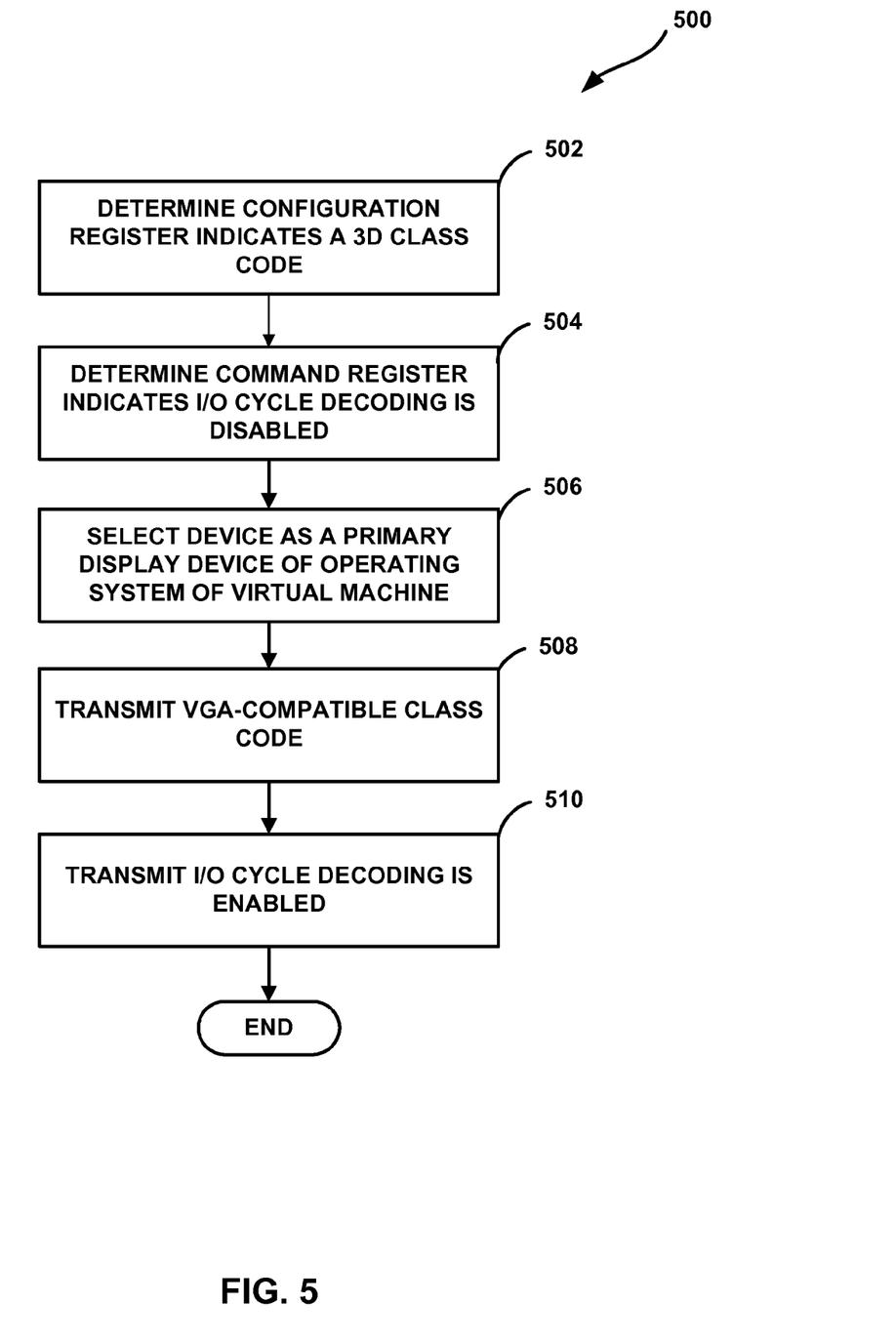
FIG. 5 is a flowchart illustrating an example method for virtualizing register values of a device according to the techniques of this disclosure.

FIG. 5 is a flowchart illustrating an example method for virtualizing register values of a device according to the techniques of this disclosure. Although method 500 is described as being performed by GPU configuration module 302, method 500 may be performed by graphics processing computing device 200 and any combination of components thereof. In one example, GPU configuration module 302 may be implemented as a patch included in any of the example hypervisors described above. GPU configuration module 302 determines that a configuration register of a device indicates that the device includes a 3D class code (502). GPU configuration module 302 determines that a command register of the device indicates that I/O cycle decoding is disabled for the device (504). GPU configuration module 302 selects the device as a primary display device for an operating system of a virtual machine (506). GPU configuration module 302 transmits a configuration register value to the operating system that indicates that the device includes a VGA-compatible class code (508). GPU configuration module 302 transmits a command register value to the operating system that indicates that I/O cycle decoding is enabled for the device (510). The method 500 may be used to enable a virtualize server to deploy more GPUs.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for a hypervisor to virtualize register values of a graphics processing unit, the method comprising:
   determining by the hypervisor that a configuration register of the graphics processing unit indicates that the device includes a 3D class code;
   selecting the graphics processing unit as a primary display device for a virtualized operating system; and
   virtualizing the configuration register and a command register of the graphics processing unit by transmitting a configuration register value from the hypervisor to the operating system that indicates that the graphics processing unit includes a VGA-compatible class code instead of the 3D class code included in the configuration register of the graphics processing unit and transmitting a command register value from the hypervisor to the operating system that indicates that I/O cycle decoding is enabled for the graphics processing unit.

2. The method of claim 1, wherein the graphics processing unit is configured for communication according to a PCI bus specification.

3. The method of claim 2, wherein the graphics processing unit is operably coupled to a PCI switch architecture that supports a limited number of devices including a VGA-compatible class code.

4. The method of claim 2, wherein the graphics processing unit is operably coupled to a PCI switch architecture that supports a theoretical maximum of 16 graphics processing units including a VGA-compatible class code and supports more than 16 graphics processing units including a 3D class code.

5. The method of claim 1, wherein the operating system is constrained to use a graphics processing unit including a VGA-compatible class code as a primary display device.

6. The method of claim 5, wherein the operating system is further constrained to use a graphics processing unit indicating that I/O cycling is enabled as a primary display device.

7. The method of claim 6, wherein the graphics processing unit is included in a server configured to support a cloud based gaming service.

8. A non-transitory computer-readable storage medium comprising instructions stored thereon, that upon execution, cause one or more processors to:
   determine that a configuration register of a graphics processing unit indicates that the graphics processing unit includes a 3D class code;
   select the graphics processing unit as a primary display device for a virtualized operating system; and
   virtualize the configuration register and a command register of the graphics processing unit by transmitting a configuration register value to the operating system that indicates that the graphics processing unit includes a VGA-compatible class code instead of the 3D class code included in the configuration register of the graphics processing unit and transmitting a command register value to the operating system that indicates that I/O cycle decoding is enabled for the graphics processing unit device.

9. The non-transitory computer-readable storage medium of claim 8, wherein the a graphics processing unit is configured for communication according to a PCI bus specification.

10. The non-transitory computer-readable storage medium of claim 9, wherein the graphics processing unit is operably coupled to a PCI switch architecture that supports a limited number of graphics processing units including a VGA-compatible class code.

11. The non-transitory computer-readable storage medium of claim 10, wherein the graphics processing unit is operably coupled to a PCI switch architecture that supports a theoretical maximum of 16 graphics processing units including a VGA-compatible class code and supports more than 16 graphics processing units including a 3D class code.

12. The non-transitory computer-readable storage medium of claim 8, wherein the operating system is constrained to select a graphics processing unit including a VGA-compatible class code as a primary display device.

13. The non-transitory computer-readable storage medium of claim 12, wherein the operating system is further constrained to select a graphics processing unit indicating that I/O cycling is enabled as a primary display device.

14. The non-transitory computer-readable storage medium of claim 13, wherein the graphics processing unit is included in a server configured to support a cloud based gaming service.

15. A device for processing graphics data, the device comprising:
   a plurality graphic processing units, each corresponding to one of a plurality of virtualized operating systems, wherein each of the graphics processing units includes a configuration register indicating that the graphics processing unit includes a 3D class code and a command register indicating that I/O cycle decoding is disabled for the graphics processing unit; and
   a non-transitory computer readable medium having instructions stored thereon that, when executed, cause one or more processors of the device to:
   virtualize the configuration register and the command register of one or more of the graphics processing units by transmitting a configuration register value to a virtualized operating system corresponding to one of the plurality of graphic processing units that indicates that the graphic processing unit includes a VGA-compatible class code instead of the 3D class indicated by the configuration register of the graphics processing unit and transmitting a command register value to the virtualized operating system corresponding to the one of the plurality of graphic processing units that indicates that I/O cycle decoding is enabled for the graphics processing unit.

16. The device of claim 15, wherein each of the plurality of graphics processing units are operably coupled to a PCI switch architecture that supports a limited number of devices including a VGA-compatible class code configured.

17. The device of claim 15, wherein each of the virtualized operating systems is configured to select a device including a VGA-compatible class code as a primary display device.

18. The device of claim 17, wherein each of the virtualized operating systems is further configured to select a device indicating that I/O cycling is enabled as a primary display device.

19. The device of claim 15, wherein the plurality of graphic processing units includes at least sixteen graphics processing units and wherein the device is a server configured to support a cloud based gaming service.

20. The device of claim 15, wherein the plurality of graphic processing units includes three graphics processing units having a 3D controller class code and one graphics processing unit having a VGA-compatible class code.

* * * * *